US008685555B2

(12) United States Patent
Borel et al.

(10) Patent No.: US 8,685,555 B2
(45) Date of Patent: Apr. 1, 2014

(54) THERMO-MECHANICALLY ACTIVATED CURRENT INTERRUPTER (75) Inventors: Philippe Borel, Bruges (FR); Cecile Tessier, Bruges (FR)

(73) Assignee: Saft Group SA, Bagnolet (FR)

( * ) Notice: Subject to any disclaimer, the term of this patent is extended or adjusted under 35 U.S.C. 154(b) by 523 days.

(21) Appl. No.: 12/914,460

(22) Filed: Oct. 28, 2010

(65) Prior Publication Data
US 2011/0117393 A1   May 19, 2011

(30) Foreign Application Priority Data
Nov. 17, 2009   (FR) ...................................... 09 58120

(51) Int. Cl.
*H01M 2/12* (2006.01)
*H01M 2/34* (2006.01)

(52) U.S. Cl.
USPC .................. 429/62; 429/53; 429/56

(58) Field of Classification Search
USPC ............. 429/7, 72, 50–64, 96–100, 163–187; 29/623.1–623.5
See application file for complete search history.

(56) References Cited

U.S. PATENT DOCUMENTS

| 5,705,290 A * | 1/1998 | Azema ........................... 429/53 |
| 5,766,793 A * | 6/1998 | Kameishi et al. ............... 429/62 |
| 2006/0199046 A1* | 9/2006 | Dewulf et al. .................... 429/7 |
| 2010/0243345 A1* | 9/2010 | Yebka et al. ................. 180/65.1 |

FOREIGN PATENT DOCUMENTS

| JP | 10208726 A | 8/1998 |
| WO | 9845887 A1 | 10/1998 |

OTHER PUBLICATIONS

French Search Report, dated Jun. 8, 2010, for FR2952753, pp. 1-2.
French Search Report for 10188956.6-1231/2337053, dated May 25, 2011, pp. 1-6.

* cited by examiner

*Primary Examiner* — Jonathan Crepeau
*Assistant Examiner* — Caitlin Wilmot
(74) *Attorney, Agent, or Firm* — Sughrue Mion, PLLC (57) ABSTRACT

A safety current interrupter device for a rechargeable cell is provided comprising a deformable material (2) adapted to deform when the temperature reaches a threshold value, a deformable membrane (3) adapted to deform under the effect of pressure and/or deformation of the deformable material (2), and an electrically conductive link member (4), adapted to break as a result of the deformation of the deformable membrane (3).

19 Claims, 3 Drawing Sheets

THERMO-MECHANICALLY ACTIVATED CURRENT INTERRUPTER

BACKGROUND OF THE INVENTION

1. Field of the Invention

The present invention relates to a safety current interrupter device. In particular it relates to a safety current interrupter device for use in a secondary cell.

2. Discussion of Prior Art

A secondary cell or electrochemical cell (both terms being equivalent, we shall use the term secondary cell in this description) includes in a known manner an electrode plate group comprising alternating positive and negative electrodes flanking separators, the entire electrode plate group being impregnated with electrolyte. Each electrode includes a metal current collector carrying an electrochemically active material on at least one of its faces. The electrode is electrically connected to output terminal means providing electrical continuity between the electrode and the external application to which the secondary cell is associated. The electrode plate group is placed in a container tightly closed by a lid.

A secondary cell is generally designed to operate at so-called nominal values, ie in a given temperature, current and voltage range. When a secondary cell is operated outside of its nominal conditions, such as accidental overcharging, a short circuit or an external temperature higher than the maximum operating temperature, this creates a risk of explosion. Indeed, such situations can lead to overheating of the electrolyte and the formation of electrolyte vapor. The accumulation of vapor in the container increases the pressure inside the secondary cell, which can lead to violent rupture of the container and the projection of chemicals which are harmful and corrosive to the environment and to people nearby.

Typically, a safety current interrupter device can be built into the lid of the secondary cell. The safety device is able to quickly interrupt the electrical circuit in the battery in the case of operation outside rated conditions. Thus, the battery stops working. The current interrupter function makes it possible to isolate the secondary cell, irreversibly, from apparatus connected to the secondary cell.

The safety device can also include a safety vent function to prevent gas buildup inside the container of the cell, and allow gas to escape when the internal pressure exceeds a predetermined value. The release of gas through the vent avoids an explosion of the cell.

The security device can be activated by pressure in the secondary cell. However gas production in the case of operation outside nominal conditions can not cause sufficient pressure to activate the safety device. Additives can be added in the electrolyte, such as carbon compounds. These additives are released in gaseous form as a result of increasing temperature, thereby increasing the sensitivity of the safety device. However additives disrupt chemical reactions taking place in normal operation of the secondary cell. As a result, the lifetime and performance of the cell is diminished.

Therefore it may be advantageous to supplement the activation of the safety device in response to pressure by operation responsive to temperature.

French patent application FR-A-2,881,580 discloses a secondary cell comprising a current interrupter actuated by an internal pressure of the secondary cell. The device includes an electrical link member handling the current flow. The link member is placed over a membrane, and is electrically insulated from the membrane. Excessive internal pressure of the secondary cell causes a deformation of the membrane leading to rupture of the link member. Nevertheless, the current interrupter can only be activated under the effect of pressure. The current interrupter is consequently wholly dependent on the electrochemical process generating the pressure. It is not possible to activate the device as a result of an increase in temperature.

JP-A-63072062 discloses a safety vent system that can be actuated by the temperature of the cell. The safety venting system consists of a shape memory material connected to one terminal of the cell at one end, and positioned on a portion sealing off the cell at its other end. In the presence of an excessive rise in temperature the shape memory material deforms and breaks the sealing portion of the cell, allowing the escape of gases formed in the secondary cell. The activation of this system depends on the temperature of the cell. However the system cannot be activated by an increase in pressure. Furthermore the system only comprises a safety venting function, and no current interrupter function.

In the above documents, the devices are actuated by either pressure or temperature. None of the devices is sensitive to both pressure and temperature.

International application WO-A-9845887 discloses a secondary cell including in its cover, a first current interrupter actuated by a rise in temperature and a second device operable by excessive pressure in the secondary cell. The first current interrupter device includes a material deformable as a result of an increase in temperature, and a conductive line. Under the effect of increasing temperature, the deformable material causes a change in position of the conductive line and interrupts the current flow. The second current interrupter device includes a metal membrane ensuring the passage of current, on top of a rigid conductive plate. The membrane can be deformed under the action of an excessive pressure on the membrane. The membrane is then driven out of contact with the rigid conductive plate causing an interruption of current flow. The current interrupter devices in that international application also perform a safety venting function.

The secondary cell described in the above document includes a current interrupter function actuated by a pressure or temperature. However, the current interrupter function is split up into two devices: a pressure-actuated device, and a temperature-actuated device. The safety venting function is actuated by a pressure increase. In addition, in order to be deformable, the membrane must not be too thick, meaning that it cannot carry a high current, which limits the secondary cell to low power applications.

There is consequently a need for a current interrupter function that is actuated by pressure and by temperature, combined into one single device, and which is not limited to low power applications.

SUMMARY OF THE INVENTION

The invention provides a safety current interrupter comprising a deformable material, a membrane and a link member. The deformable material is adapted to deform as a result of an increase in temperature. An excessive temperature causes a deformation of the deformable material which causes the rupture of the link member. The membrane is deformable under the action of increased pressure. Excessive pressure results in deformation of the membrane causing rupture of the link member. Thus the link member can be broken as a result of pressure and/or temperature. The device includes actuating means sensitive to pressure and temperature, acting on one and the same link member.

More particularly, the invention provides a safety current interrupter device comprising:

a deformable material adapted to deform when a temperature reaches a threshold value;

a deformable membrane adapted to deform under the effect of excess pressure, and adapted to deform as a result of deformation of the deformable material;

an electrically conductive link member, adapted to break as a result of the deformation of the deformable membrane.

According to one embodiment the deformable material and the deformable membrane deform in less than 10 milliseconds.

According to another embodiment the deformable membrane can break under excess pressure.

According to one embodiment the deformable membrane can break as a result of the deformation of the deformable material caused by a rise in temperature.

According to one embodiment the deformable material comprises two parallel rectangular portions connected by a middle rectangular portion.

In one preferred embodiment, the deformable material is star-shaped with three to seven branches, preferably five branches.

According to a further embodiment the deformable membrane is in the form of a convex-shaped dome with a concave central deformation.

According to one embodiment the deformable material is a shape memory material preferably including a nickel-titanium alloy.

According to one embodiment the link member is electrically insulated from the deformable material and the deformable membrane.

According to a further embodiment the link member has a cross-section area for current flow, width multiplied by thickness, comprised between 2 mm$^2$ and 3 mm$^2$.

According to one embodiment, the deformable membrane is adapted to deform when a pressure exceeds 3 bars.

According to a further embodiment the deformable material is adapted to deform when the temperature exceeds a threshold value of between −60° C. and 200° C., preferably between 40° C. and 200° C., even more preferably between 60° C. and 100° C.

The invention also provides a secondary cell comprising:
an electrode plate group comprising at least one positive electrode and negative electrode;
an intermediate terminal connected to the electrode plate group and which concentrates the current from the electrodes of the same polarity;
a current output terminal;
a safety current interrupter device according to the invention, the link member being arranged between the intermediate terminal and the current output terminal.

Preferably, the deformable material does not conduct current between the electrodes of one polarity and the corresponding output terminal.

Preferably, the deformable membrane does not conduct current between the electrodes of one polarity and the corresponding output terminal.

According to one embodiment, the secondary cell is of the Li-ion type.

Other features and advantages of the invention will be apparent from reading the following description given by way of example and with reference to the drawings.

DETAILED DESCRIPTION OF A PREFERRED EMBODIMENT

Figure 1:
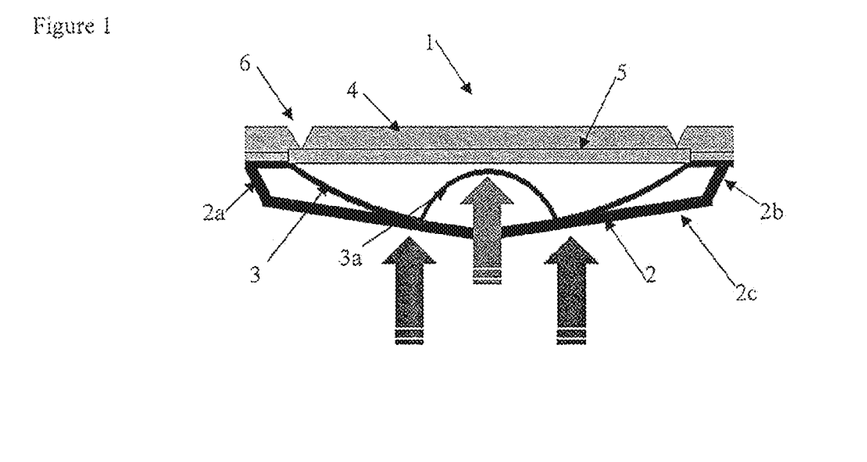
FIG. 1 is a sectional view of an exemplary current interrupter device according to the invention.
Figure 2:
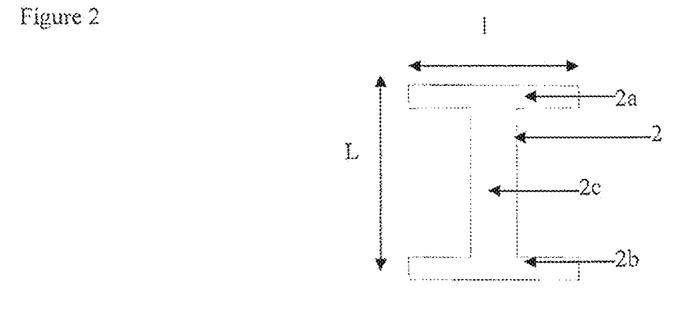
FIG. 2 is a top view of an example of the deformable material.
Figure 3:
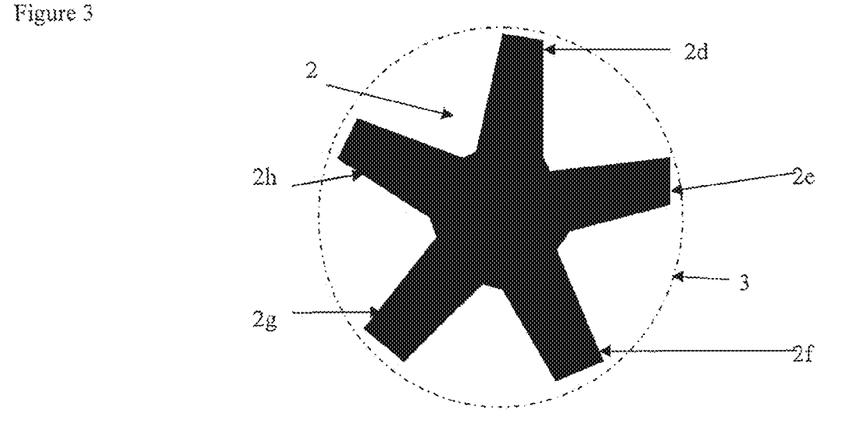
FIG. 3 is a top view of another example of the deformable material.

The invention will be better understood with reference to FIGS. 1, 2 and 3 which respectively show a sectional view of an exemplary safety current interrupter device according to the invention, and two examples of deformable material of the safety current interrupter device of the invention.

The safety current interrupter device 1 includes a deformable material 2 adapted to deform under the effect of increasing temperature, a deformable membrane 3 adapted to deform under the effect of excess pressure and/or deformation of the deformable material 2. The device also includes an electrically conductive link member 4. Link member 4 is adapted to rupture under the effect of deformation of the deformable membrane 3. The current interrupter 1 according to the invention therefore comprises activation under the effect of elevated pressure and activation under the effect of a rise in temperature. In other words, the current interrupter 1 can be activated by excessive pressure exerted on the deformable membrane 3, and/or excessive heat resulting in a distortion of the deformable material 2.

The deformable material 2, the deformable membrane 3 and link member 4 can present a layout that facilitates the action of the deformable material 2 and the deformable membrane 3 on link member 4. In the example shown in FIG. 1, the deformable material 2, the deformable membrane 3 and link member 4 are placed one on top of the other. The deformable material 2, the deformable membrane 3 and link member 4 can also be integral over at least a portion of their periphery.

The deformable material 2 is a material whose shape depends on its temperature. Under the effect of a temperature exceeding a predetermined temperature, the deformable material 2 adopts a shape which causes deformation of the deformable membrane 3 and the breaking of link member 4. The deformable material 2 can be a shape memory material, that is to say having a predetermined shape after a rise in temperature. The deformable material 2 can be a dual effect shape memory material. Thus, after activation by temperature increase, the deformable material 2 returns to its original shape when the temperature decreases. Preferably for definitive activation of the current interrupter 1, deformable material 2 is a material with one-way shape memory. After its activation by a rise in temperature, the deformable material 2 does not return to its original shape when the temperature decreases.

Preferably the deformable material 2 is located underneath deformable membrane 3. The deformable material 2 can also make a shape that facilitates the action of pressure on the deformable membrane 3.

FIG. 2 shows a top view of an example of deformable material 2 in the form of an H. This means that the deformable material 2 can have two parallel portions 2a, 2b interconnected by a middle perpendicular portion 2c. Thanks to the spaces provided in the sides of the deformable material 2, a pressure can be exerted on the deformable membrane 3 which is above it. In the example shown in FIG. 2, the deformable material 2 can for example have a length L of between 10 and 15 mm, preferably between 12 and 13 mm and a width of between 10 and 15 mm, preferably between 10 and 12 mm. The middle perpendicular portion 2c can have a length of about 8-15 mm, preferably between 9 and 10 mm and a width of about 1-5 mm, preferably between 2 and 4 mm. The deformable material 2 can be connected to the deformable membrane 3 and link member 4 by means of two parallel portions 2a, 2b.

The deformable material 2 can also be star-shaped with several branches as shown in FIG. 3. This means that the deformable material 2 can be formed of several axes interconnected at one of their ends, to form the spokes of a disc. When the temperature rises the common end of the branches rises until deformable membrane 3 becomes deformed, causing the rupture of link member 4. In this configuration the deformable material 2 in the shape of a star can have three to seven branches. Preferably, in the example shown in FIG. 3, the deformable material 2 is in the form of a five-pointed star (2d, 2e, 2f, 2g, 2h).

The deformable material 2 can have a convex shape prior to activation, which is to say a downward deflection if we consider FIG. 1. In other words, prior to activation, the deformable material 2 can exhibit a deformation departing it from the link member 4. After activation by a rise in temperature, the deformable material 2 can now have a concave shape, that is to say be deformed upwardly when considering FIG. 1. In other words, after activation the deformable material 2 can exhibit a deformation bringing it in a direction of link member 4. This deformation approaches link member 4, to a point that it brings about deformation of the deformable membrane 3 and the breaking of link member 4.

The deformable material 2 has a shape that is temperature-dependent. Such a material can for example be a shape memory material such as an Ni—Ti (nickel-titanium) alloy, or a polymer.

The composition and dimensions of the deformable material 2 also influence its responsiveness to temperature.

It is thus possible to modulate the activation by a rise in temperature of the safety current interrupter by adapting the composition of the deformable material 2. This makes it possible to employ the safety current interrupter in numerous different applications without the need to specifically design the mechanism of the current interrupter 1. Thus the safety current interrupter 1 can be used in a temperature range from −60° C. to 200° C. In particular, the current interrupter 1 can be used in a secondary cell over a temperature range from −60° C. to 200° C.

The deformable material 2 also has a thickness that allows it to deform temperature-dependently. In the example shown in FIG. 2, the deformable material 2 can for example have a thickness of about 0.1 to 2 mm. In the example shown in FIG. 3, the branches of the deformable material 2 in the shape of a star can have a thickness of from 0.2 mm to 1 mm.

Thus the deformable material 2 can be adapted to deform when the temperature exceeds a threshold value between −60° C. and 200° C., preferably from 40° C. and 200° C., even more preferably between 60° C. and 100° C. The threshold temperature for the deformation of the deformable material 2 can be determined to within plus or minus 2° C., by varying the composition and/or thickness of the deformable material 2.

Figure 4:
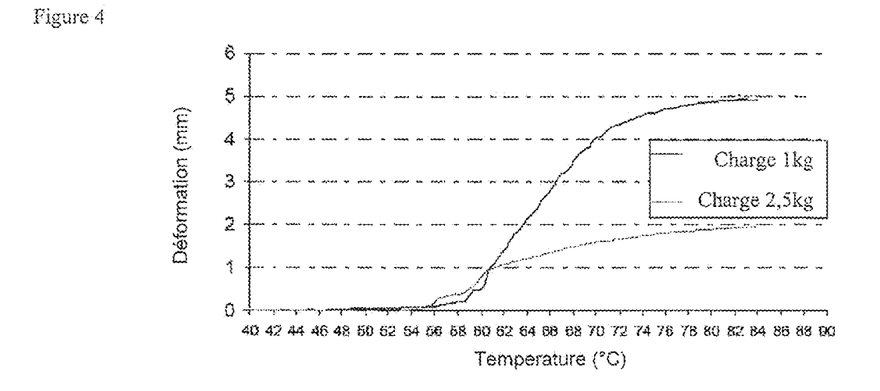
FIG. 4 is a graph representing the deformation of the deformable material.

Tests have been made which show that the deformable material 2 can effectively break a link member 4 under the effect of a rise in temperature. A deformable material 2 was raised in temperature from 25° C. to 85° C. under a mechanical load of 10 N, corresponding to a load of 1 kg, and a mechanical load of 25 N, corresponding to a load of 2.5 kg. FIG. 4 shows the resulting deformation in mm as a function of the applied temperature. The curves show a significant deformation of the deformable material 2 even under mechanical load opposing the deformation. The deformable material 2 can thus be deformed under the effect of temperature to cause a breakage of link member 4.

The deformable membrane 3 is adapted to deform under the effect of pressure above a predetermined threshold, or as a result of deformation of the deformable material 2, causing the rupture of link member 4.

Preferably the deformable membrane 3 is placed above the deformable material 2 and below link member 4.

The deformable membrane 3 covers the whole of link member 4, that is to say that its surface area is larger than that of link member 4. The deformable membrane 3 can have a substantially circular or rectangular shape, or any other suitable shape suitable for bringing about rupture of link member 4.

In particular, the deformable membrane 3 can be a convex-shaped dome, that is to say, exhibit a downward deflection when considering FIG. 1. In other words, before activating it, the deformable membrane 3 can have a deformation away from the link member 4. The deformable membrane 3 can also have a concave central deformation 3a, that is to say have an upwardly-directed deformation when considering FIG. 1. That is the central portion 3a of the deformable membrane 3 can present a deformation directed towards link member 4, that is to say in the direction in which pressure is applied to the safety current interrupter 1. The concave central portion 3a facilitates the deformation of the deformable membrane 3 under the effect of pressure. In addition, the concave central portion 3a is almost in contact with link member 4. The concave central portion 3a thus forms a kind of push button against link member 4 when the deformable membrane 3 is deformed. Thus a small deformation of the deformable membrane 3 causes a break in link member 4.

The deformable membrane 3 can have a concave shape after it has been activated by pressure and/or the deformable material 2, that is to say an upwardly-directed deformation when considering FIG. 1. In other words, after activation the deformable membrane 3 can have a deformation that progressively approaches link member 4, to cause almost immediate rupture of link member 4 in a few milliseconds for example.

The material of the deformable membrane 3 depends on the context in which the safety current interrupter 1 is used. The material of the deformable membrane 3 can be, for example nickel steel, stainless steel, aluminum, or copper. For an application in a secondary cell which will be described below, the material of the deformable membrane 3 can be of all metal, alloys or materials compatible with the electrolyte of the secondary cell, especially aluminum.

Preferably the deformable membrane 3 is very thin, for example between 100 and 150 μm, preferably 125 μm, in the annealed aluminum state. A membrane as thin as this can be employed as it is not intended to conduct an electrical current. The shape of the membrane 3 allows however, despite its thinness, a force of about 20N to be exercised on link member 4 when it deforms.

The dimensions of the deformable membrane 3 determine its sensitivity to pressure. Thus, the shape and dimensions of the dome of the membrane 3 can be such that the amplitude of deformation of the membrane 3 is greater than 1.5 mm when deformed under the effect of excess pressure.

In addition, the deformable membrane 3 can be adapted to deform under the effect of a pressure higher than 3 bars. The deformable membrane 3 can also be adapted to cause the rupture of link member 4 under the effect of a pressure between 5 and 9 bars.

Link member 4 ensures the passage of electrical current. Link member 4 is adapted to break under deformation of the deformable material 2 or of the deformable membrane 3. Preferably, link member 4 is placed above the deformable membrane 3.

Link member 4 is of an electrically conductive material, such as aluminum, copper or nickel among others. Preferably, link member 4 can be made of aluminum, as aluminum has characteristics favorable to a clean break as a result of pressure from the deformable membrane 3, and/or deformable material 2. Also aluminum is particularly suitable for use in a secondary cell, as described below.

Depending on the application in which the safety current interrupter 1 is employed, link member 4 can be electrically insulated from deformable material 2 and the deformable membrane 3 by an insulator 5. The insulator 5 can be chosen to withstand the temperature rise resulting from the passage of a large current in link member 4, in particular a current of the order of 50 A and up to 100 A. In addition, insulator 5 should have sufficiently elastic mechanical characteristics so as not to hinder the deformation of the membrane 3 and interfere with the force it exerts on link member 4. The insulator 5 can be of PVC (Polyvinylchloride) and retain its insulating characteristics over a temperature range from −40 to +120° C.

However one limitation resides in the fact that link member 4 must break under deformation of deformable membrane 3 or deformable material 2. To facilitate its rupture, link member 4 can present areas of weakness 6. These areas of weakness 6 can be located on one end or at the center of link member 4. The areas 6 of weakness can be formed by notches in the thickness of link member 4, preferably extending the full width of the member. The weakening notches 6 should be deep enough to ensure the rupture of link member 4, but without introducing too much internal resistance which would prevent the conduction of high current. For example, link member 4 can have a cross section from 2 to 3 mm$^2$ with a width much greater than its thickness so that the conductive cross-section of link member 4 is only slightly modified by the notches of weakness 6. Link member 4 can thus conduct a current up to 100 A. Thus the safety current interrupter can be used in high power applications.

Figure 5:
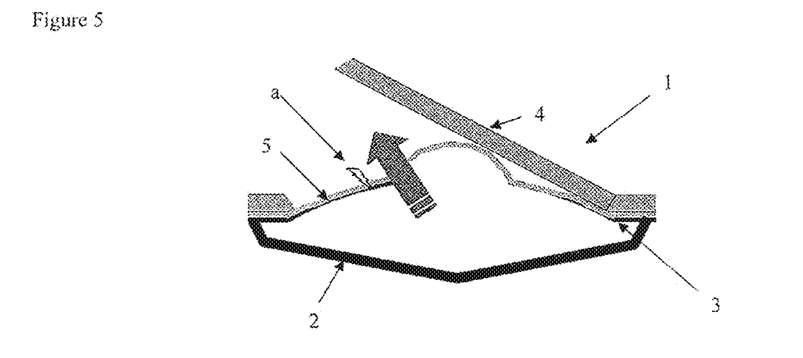
FIG. 5 is a sectional view of the current interrupter device in its final state after activation by pressure.
Figure 6:
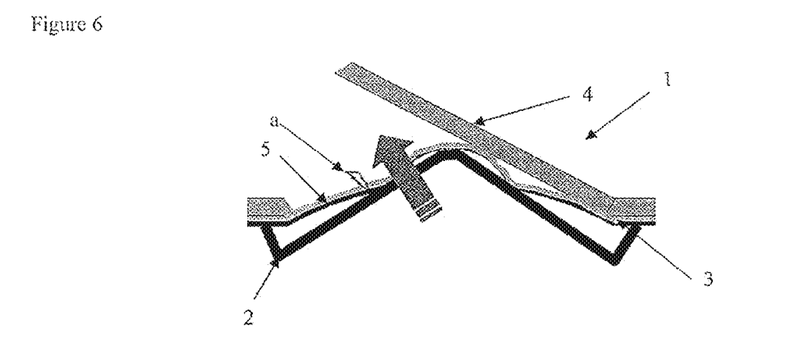
FIG. 6 is a sectional view of the current interrupter device in its final state after activation by temperature.

The operation of the safety current interrupter 1 will be better understood with reference to FIGS. 5 and 6 which show examples of operation of the safety current interrupter according to the invention.

FIG. 5 shows an example of activation of the safety current interrupter under pressure. As a result of excessive pressure, there is deformation of the deformable membrane 3 applying a load to link member 4. Link member 4 breaks under the effect of deformation of the deformable membrane 3.

FIG. 6 shows an example of activation of the safety current interrupter 1 by temperature. Under the effect of excessive temperature, there is deformation of the deformable material 2. The deformable material 2 brings about deformation of the deformable membrane 3 applying a force and leading to failure of link member 4.

The activation of the safety current interrupter 1 can also be obtained by the combined action of pressure and temperature. In this case excessive pressure causes deformation of the deformable membrane 3. An excessive temperature causes the deformation of deformable material 2, which also causes deformation of the deformable membrane 3. Link member 4 is placed under load, and then breaks.

The characteristics of the safety current interrupter, such as, inter alia, the amplitude or rate of deformation of the deformable material 2 and the deformable membrane 3, the range of sensitivity to pressure or temperature, distance from link member 4 can be chosen depending on the intended application.

For example, the deformable membrane 3 can be adapted to deform suddenly, thereby applying a stress to link member 4 leading to its failure. To take another example, the deformable material 2 can present a deformation just sufficient to deform the deformable membrane 3, deformable material 2 not reaching the link member 4, and the deformable membrane 3 causing the rupture of link member 4. Alternatively, the deformable material 2 can have a deformation that causes deformation of the deformable membrane 3 but also comes to about mechanically against link member 4.

Preferably, the deformable material 2 and the deformable membrane 3 are rated to bring about almost immediate rupture of the link member 4. The activations of deformable material 2 and the deformable membrane 3 take place snappily and cleanly, avoiding an intermediate state between activated and not activated. Thus, the safety current interrupter can be reactive and adapted to act almost immediately and completely in a period of a few milliseconds. For example, the deformable material 2 and the deformable membrane 3 can be deformed in less than 10 milliseconds.

The safety current interrupter can also combine the functions of a safety vent to allow gas to escape indicated by "a" in FIGS. 5 and 6. The safety current interrupter device can perform a gas release "a" as a function of pressure and/or temperature. Thus the deformation of the deformable membrane 3 can bring about its rupture.

In other words the deformable membrane 3 can be rated to rupture as a result of an excess pressure. For example, the deformable membrane 3 can be adapted to break under a pressure of between 12 and 16 bars.

The deformable membrane 3 can also be rated to break as a result of deformation of the deformable material, 2 induced by a rise in temperature. For example, the deformable membrane can break as a result of deformation of the deformable material 2, caused by a temperature of between 40° C. and 200° C.

Thus, the device of the invention can be used simply as a current interrupter, or as a current interrupter and safety venting means. The device is operable under the effect of a rise in temperature, or of a rise in internal pressure. The device is also able to be actuated under the effect of a rise in temperature and internal pressure.

The deformable membrane 3 can be locally weakened to facilitate its rupture. For example, the deformable membrane 3 can have a thinning of its thickness. Thus the failure of the deformable membrane 3 is facilitated. Further, membrane breakage can then occur without losing material, that is to say without complete tearing of the deformable membrane 3.

If link member 4 is insulated from the deformable membrane 3 and the deformable material 2 by the insulator 5, the insulator 5 can also be rated to break at the same time as deformable membrane 3 to thereby provide a safety vent function.

The invention also provides a secondary cell comprising a safety current interrupter 1 according to the invention. In particular, the secondary cell of the invention can be of the lithium-ion type.

The secondary cell according to the invention comprises an intermediate terminal, an output terminal, and an electrode plate group comprising at least one positive electrode and negative electrode. The intermediate terminal is connected to the electrode plate group and concentrates the current from the electrodes of the same polarity. The secondary cell also includes safety current interrupter device 1, link member 4 being arranged between the intermediate terminal and the output terminal. Link member 4 allows current to flow from the intermediate terminal to the output terminal.

The secondary cell according to the invention has enhanced safety through the provision of safety current interrupter device 1.

Indeed, in the case of abnormal operation of the secondary cell, such as an overload of the secondary cell resulting in an increase in temperature of the cell, or in the case of a rise in secondary cell temperature due to abnormal external conditions, such as fire, the safety current interrupter—being activated by temperature—can effectively interrupt the electrical circuit of the cell.

The operation of the secondary cell can also be stopped in case of gassing in the inner portion because the safety current interrupter device 1 is also activated by the internal pressure of the secondary cell.

In addition, any risk of explosion of the cell can be prevented, because the safety current interrupter device can include a safety venting feature activated in the presence of a pressure or temperature above a predetermined threshold.

The secondary cell according to the invention will be described more specifically with reference to FIG. 7 which shows a longitudinal section of the upper portion of a sealed lithium-ion cylindrical sell equipped with the safety current interrupter 1.

The cell includes a container and a lid 11 which carries the current output terminals of the cell. One of the output terminals is welded to the lid and the other output terminal passes through the lid. In the example illustrated, the container and the lid 11 are the positive pole, and so it is the positive terminal which is welded to the lid 11. The negative terminal 13 is fixed to the lid 11 by a screwed or crimped rivet passing through the thickness of the lid 11. An insulator 14 electrically isolates the output terminal 13 from lid 11.

The electrode plate group formed by a winding of positive, negative electrodes and separator is disposed in the container around a hollow rod which serves as a gas chimney. The positive electrode consists of a current collector, which can be an aluminum foil covered with an active material consisting of lithiated oxides of transition metals such as $LiCoO_2$, $LiNiO_2$, $LiMnO_2$, $LiMn_2O_4$ or $LiMO_2$, where M is a transition metal or a mixture of transition metals or aluminum. The active ingredient can also be composed of phosphates of transition metals. The negative electrode consists of a current collector, which can be a copper foil, covered with active material made of a material capable of reversibly inserting lithium, such as graphite, coke, vitreous carbon, carbon black, or metal alloys or composites. The separator can be of polyolefin, or other organic compound such as polyimide or polyethylene terephthalate. At least one positive electrode, at least one separator and at least one negative electrode laid one on top of the other to form the electrode plate group and electrochemical electrode plate group is wrapped around the hollow rod.

A flat connection connects the positive electrode of the electrode plate group to a wall of the container, the container walls and the lid 11, being electrically conductive, are connected to the positive current output terminal. Another flat connection connects the negative electrode of the electrode plate group to the intermediate terminal 12 electrically connected to the negative current output terminal 13. The outer insulation 14 electrically isolates the negative intermediate terminal 12 from lid 11.

The positive and negative electrodes can be welded to their flat connection. A connection of flat shape is preferable, but any other type of connection is possible.

An internal insulation 15 is placed between the electrode plate group and the walls of the container and the lid 11. It consists of a material resistant to heat, chemically stable and serves as an electrical insulator to prevent electrical contact between the edge of a negative electrode of the electrode plate group and the walls of the container lid 11 and of the container connected to the positive terminal, which could cause a short circuit.

The safety current interrupter 1 is disposed between the negative intermediate terminal 12 and negative current output terminal 13.

In particular, link member 4 can be fixed at one of its ends to the intermediate terminal 12 passing through the lid 11 to connect the negative electrode of the electrode plate group, and at its other end to the negative current output terminal 13. Link member 4 thus extends outside the container of the secondary cell, above the lid 11. The ends of link member 4 can be attached to terminals 12, 13 by riveting or laser welding. This will avoid the risk of short circuit between link member 4 electrically connected to the negative terminal 13 and the lid 11 electrically connected to the positive terminal by fastening the link member 4 on the top of the terminals 12, 13. An insulating layer 5 is also provided, which will be described later.

Preferably link member 4 is made of aluminum. Indeed aluminum facilitates assembly by welding of the link member 4 with the copper, copper nickel, or nickel terminals of the secondary cell.

The deformable membrane 3 is positioned inside the container, carried in an opening 17 in lid 11 so as to receive the pressure of gas caused by a malfunction of the cell. The insulation 15 can be perforated at the opening 17 to allow the passage of gas from inside the secondary cell. The deformable membrane 3 can be formed by localized thinning of the lid 11 or by a foil or sheet added at the opening 17 in the lid 11. The deformable membrane 3 can for example be welded to the periphery of the opening 17 provided in the lid 11.

Figure 7:
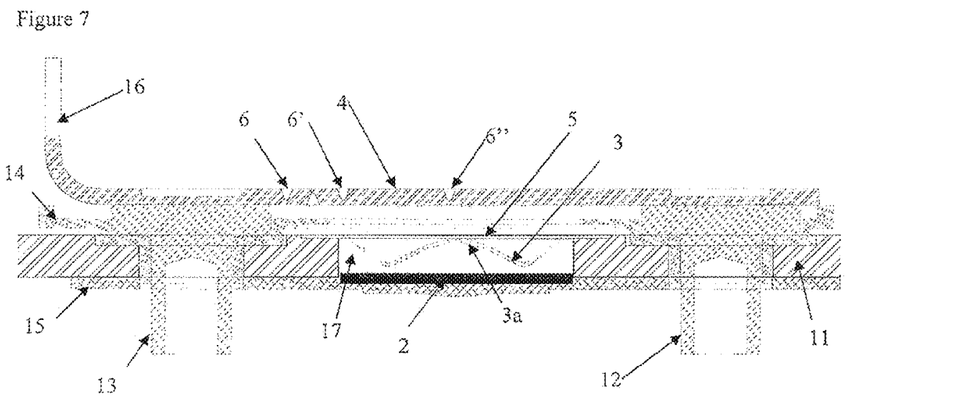
FIG. 7 is a sectional view of a portion of a secondary cell comprising the current interrupter according to the invention.

In the example shown in FIG. 7, the deformable membrane 3 has a concave deformation in its central portion 3a, that is to say a deformation towards the outside of the cell.

The material of the deformable membrane 3 is chosen to be compatible with the electrolyte of the container, and form a seal during normal operation of the secondary cell. Indeed, the deformable membrane 3 is in contact with the inside of the container and is subject to the vapors of the electrolyte during operation of the cell. The presence of such vapor must not be a cause of electrical malfunctions. Thus, in alkaline battery technology for example, deformable membrane 3 is made of polymer. With lithium-ion technology, the deformable membrane 3 is preferably aluminum. In addition, aluminum is chosen for reasons of compatibility with the material used for welding lid 11. Indeed, the lid 11 is of aluminum when the container and cover are the positive pole of the cell.

The deformable material 2 is also positioned inside the container, which is to say under the lid 11, so as to be responsive to the temperature inside the cell, and deform at excessive temperatures in the secondary cell.

The deformable material 2 can be H-shaped as described above. The deformable material 2 can then be attached to the inside of the lid 11 via two parallel portions 2a, 2b. The portions 2a and 2b can be secured for example by a weld, or adhesive. The middle portion 2c of the deformable material 2 is positioned under opening 17 in order to deform the deformable membrane 3 when activated by a rise in temperature.

The deformable material 2 can also be star-shaped as described above. The star-shaped deformable material 2 can be inserted into the opening 17 arranged in the lid 11, without being attached at its ends. In other words, the star-shaped ends of the deformable material do not include fastening means, such as adhesive or solder for example. The star-shaped deformable material 2 can then rest on the insulation 15 and can also be maintained in the opening 17 by the friction of its ends on the wall of the opening 17. A washer can be inserted between the insulation 15 and the star-shaped deformable material 2 to improve the support of deformable material 2 shaped in a star shape.

As described above, the star-shaped deformable material 2 has at least three branches. These branches provide stable support for deformable material 2, and ensure that the deformation of star-shaped deformable material 2 takes place in a direction vertical to the deformable membrane 3.

Through being introduced into the opening 17, the deformable material 2 is closer to the deformable membrane 3. The deformation of the deformable material 2 with a rise in temperature therefore more readily brings about deformation of the deformable membrane 3.

The translational motion of the star-shaped deformable material 2 inside the opening 17 can be limited by performing a machining operation on the opening 17 or by adding an extra part, or any other suitable means.

The deformable material 2 is chosen to be compatible with the electrolyte of the cell. In particular, the resistance of deformable material 2 to electrolyte in a lithium-ion batteries was investigated. The deformable material used in these tests was an alloy of nickel and titanium (Ni—Ti).

The Ni—Ti was immersed in a sample of 17.58 g of EC/DMC/EA electrolyte (that is to say composed of a mixture of ethyl carbonate, dimethyl carbonate, and ethyl acetate) and including a lithium salt such as lithium hexafluorophosphate ($LiPF_6$) at a concentration of 1.5 M for 30 days at a temperature of 60° C.

As a reference for comparison, a control sample of 17.58 g of electrolyte not including Ni—Ti alloy was also maintained at a temperature of 60° C. for 30 days.

Salts were then added to the electrolytes and they were put into acid solution—20% nitric acid, 80% hydrochloric acid—to be analyzed by ICP spectroscopy (ICP—Inductively Coupled Plasma). The intensities corresponding to nickel and titanium were measured and compared to those obtained in reference solutions of nickel and titanium. The reference solutions of nickel and titanium were also acidic solutions, respectively at concentrations of 50 mg/l and 25 mg/l.

Table I shows the results of ICP measurements

TABLE I

| Measurements | | Reference titanium solution | Reference nickel solution | Ni—Ti-alloy free electrolyte | Electrolyte with Ni—Ti alloy |
|---|---|---|---|---|---|
| Titanium | Signal strength | 13 877 | 1 | 177 | 121 |
| | mg/l | 50 | 0 | 0.64 | 0.44 |
| | µg | | | 11 | 8 |
| Nickel | Signal strength | 12 | 3472 | 12 | 16 |
| | mg/l | 0.09 | 25 | 0.09 | 0.12 |
| | µg | | | 2 | 2 |

The first and second columns show the results obtained respectively on the titanium and nickel reference solutions. The last two columns show the results obtained respectively on the sample of electrolyte that had not contained any Ni—Ti alloy, and the sample of electrolyte that had contained a Ni—Ti alloy.

Signal strength values significantly below 200 indicate a weak signal due to background noise of the plasma torch. Signal strength values well below the detection limit of the plasma torch are highlighted in Table 1, and indicate an absence of chemical substance in the corresponding solution. Thus the reference solution of titanium does not contain nickel, and nickel solution does not contain titanium. Similarly, no presence of nickel was observed in the two samples of electrolyte.

The signal obtained for titanium for the two electrolytes is close to the detection limit of the apparatus. The weak signal obtained for titanium is due to the interferential presence of lithium and of fluorine originating from the lithium salt content in the electrolyte. This is confirmed by the fact that the signal is not greater in the sample of electrolyte which has aged with the Ni—Ti than in the sample of reference electrolyte, that is to say without Ni—Ti.

A deformable material 2 such as Ni—Ti resists therefore prolonged immersion in the electrolyte of a lithium-ion batteries.

In the example shown in FIG. 7, the deformable material 2 has a horizontal shape before activation by a rise in temperature.

However, the deformable material 2 and the deformable membrane 3 can have a convex shape prior to activation, that is to say, a downward deflection when considering FIG. 7. In other words, before activation, the deformable material 2 and the deformable membrane 3 can be deformed towards the inside of the cell. The deformable material 2 and the deformable membrane 3 can also have a concave shape after their activation, that is to say an upwardly-directed deformation when considering FIG. 7. In other words, after activation, deformable material 2 and the deformable membrane 3 can exhibit a deformation towards the outside of the cell causing the rupture of link member 4.

During operation of the current interrupter 1, when the deformable membrane 3 pushes link member 4 causing it to break, it is necessary to avoid contact between link member 4 electrically connected to the negative terminal 13 and deformable membrane 3 which has changed position, connected to the lid 11, that is to say, electrically connected to the positive terminal of the cell. An insulator 5 is consequently provided between the deformable membrane 3 and link member 4. This insulating layer 5 can be a coating layer, such as an insulating adhesive deposited on the side of the deformable membrane 3 facing link member 4, or a flexible plastic layer interposed between the deformable membrane 3 and link member 4.

Preferably the deformable material 2 does not conduct current between the electrodes of one polarity and the corresponding output terminal. This means that the deformable material 2 does not conduct current between the intermediate terminal 12 and output terminal 13.

Preferably, the deformable membrane 3 does not conduct current between the electrodes of one polarity and the corresponding output terminal. In other words the deformable membrane 3 does not conduct current between the intermediate terminal 12 and output terminal 13. Thus the parts that are sensitive to pressure and temperature are not involved in current flow between the intermediate terminal 12 and output terminal 13. Current flow between the intermediate terminal 12 and output terminal 13 is thus not limited by constraints related to sensitivity to pressure and temperature. As current flow is ensured by link member 4, link member 4 can be sized for use of the cell in high current applications.

The characteristics of the safety current interrupter, such as, inter alia, the amplitude or speed of deformation of the deformable material 2 and of the deformable membrane 3, their range of sensitivity to pressure or temperature, their distance from the link member can be chosen to be suitable for the application in which the secondary cell is used. For example, the cell can be used in high power applications. In particular, the safety current interrupter 1 can be rated for the passage of a current of up to 100 A.

To avoid any risk of damaging the safety current interrupter 1, a protective cap or cover can cover link member 4, and in particular the areas of weakness 6, 6', 6" of link member 4. Indeed, as the link member 4 is placed on top of the lid 11, there is a risk of failure or premature rupture of link member 4 should it come into contact with something.

Link member 4 of the safety current interrupter 1 can include a portion departing perpendicularly in a transverse direction, forming a connection terminal 16 as described in French patent application FR-A-2,913,530. The connection terminal 16 can for example have a region that is tinned for soldering an electronic circuit card.

Figure 8:
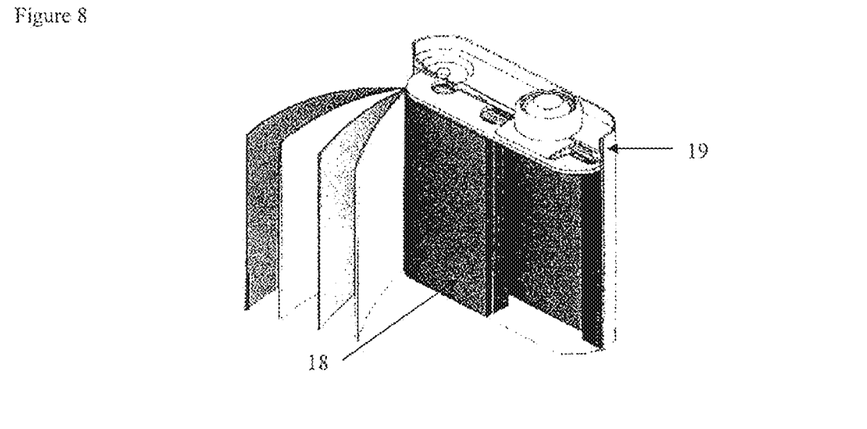
FIG. 8 is a sectional view of a prismatic secondary cell.

The cell can be for example of prismatic or cylindrical shape. In particular, the cell can have a prismatic format the base of which is a rectangle with rounded corners, as shown in FIG. 8. FIG. 8 shows a prismatic format secondary cell including an electrode plate group 18 and a container 19. The rounded corners help to minimize the dead volume between the electrode plate group 18 and the container 19 of the secondary cell.

The secondary cell according to the invention can be used in a variety of applications. The cell can be used in space, telecommunications, or in portable devices. For example, the cell can be used with built-in safety in a storage battery of cells in parallel. In the case of a short-circuit in the cell, the safety current interrupter 1 disconnects the cell from the battery, avoiding the discharge of other battery elements as a result of short-circuit in the cell without shutting down general operation of the battery.

This embodiment and the drawings should be regarded as having been presented for illustrative and not restrictive purposes. The invention is not intended to be limited to the details provided here. It can be modified while remaining within the scope of the appended claims.

In particular, the safety current interrupter can be placed on the electrical path between the positive electrode and the positive output terminal rather than between the negative electrode and the negative outlet terminal, the container then being the negative pole. Similarly, although the accompanying drawings make reference to a cylindrical cell, the current interrupter 1 of the invention is quite adaptable to a prismatic cell.

Similarly, the numerical values given in reference to the link member 4, deformable material 2, and the deformable membrane 3 do not have a limiting effect on the scope of the invention. Indeed, these values can be modified to adapt to different values of current, pressure or temperature.

The invention claimed is:

1. A safety current interrupter device comprising:
    a deformable material adapted to deform when a temperature reaches a threshold value;
    a deformable membrane adapted to deform under the effect of excess pressure, and adapted to deform as a result of deformation of the deformable material,
    wherein the deformable membrane can break as a result of the deformtration of the deformable material caused by a rise in temperature; and
    an electrically conductive link member, adapted to break as a result of the deformation of the deformable membrane.

2. The safety current interrupter device according to claim 1, wherein the deformable material and the deformable membrane deform in less than 10 milliseconds.

3. The safety current interrupter device according to claim 1, wherein the deformable membrane can break under excess pressure.

4. The safety current interrupter device according to claim 1, wherein the deformable material comprises two parallel rectangular portions connected by a middle rectangular portion.

5. The safety current interrupter device according to claim 1, in which the deformable material is star-shaped with three to seven branches.

6. The safety current interrupter device according to claim 1, wherein the deformable membrane is in the form of a convex-shaped dome with a concave central deformation.

7. The safety current interrupter device according to claim 1, wherein the deformable material is a shape memory material.

8. The safety current interrupter device according to claim 1, wherein the link member is electrically insulated from the deformable material and the deformable membrane.

9. The safety current interrupter device according to claim 1, wherein the link member has a cross-section area for current flow, width multiplied by thickness, comprised between 2 $mm^2$ and 3 $mm^2$.

10. The safety current interrupter device according to claim 1, wherein the deformable membrane is adapted to deform when a pressure exceeds 3 bars.

11. The safety current interrupter device according to claim 1, wherein the deformable material is adapted to deform when the temperature exceeds a threshold value of between −60° C. and 200° C.

12. A secondary cell comprising:
    an electrode plate group comprising at least one positive electrode and negative electrode;
    an intermediate terminal connected to the electrode plate group and which concentrates the current from the electrodes of the same polarity;
    a current output terminal; and
    a safety current interrupter device comprising:
        a deformable material adapted to deform when a temperature reaches a threshold value;
        a deformable membrane adapted to deform under the effect of excess pressure, and adapted to deform as a result of deformation of the deformable material,
        wherein the deformable membrane can break as a result of the deformation of the deformable material caused by a rise in temperature; and
        an electrically conductive link member, adapted to break as a result of the deformation of the deformable membrane, the link member being arranged between the intermediate terminal and the current output terminal.

13. The secondary cell according to claim 12, wherein the deformable material does not conduct current between the electrodes of one polarity and the corresponding output terminal.

14. The secondary cell according to claim 12, in which the deformable membrane does not conduct current between the electrodes of one polarity and the corresponding output terminal.

15. The secondary cell according to claim 12, of the Li-ion type.

16. The safety current interrupter device according to claim 5, wherein the deformable material is star-shaped with five branches.

17. The safety current interrrupter device according to claim 7, wherein the deformable material is a shape memory material including a nickel-titanium alloy.

18. The safety current interrupter device according to claim 11, wherein the deformable material is adapted to deform when the temperature exceeds a threshold value of between 40° C. and 200° C.

19. The safety current interrupter device according to claim 18, wherein the deformable material is adapted to deform when the temperature exceeds a threshold value of between 60° C. and 100° C.

* * * * *